United States Patent [19]

Wakatsuru et al.

[11] Patent Number: 5,272,235
[45] Date of Patent: Dec. 21, 1993

[54] CYCLOOLEFIN RANDOM COPOLYMER AND PROCESS FOR PREPARING SAME

[75] Inventors: Kenji Wakatsuru; Takehiko Kawate; Shigemi Shiraki; Toshihiro Sagane; Shuji Minami; Masayuki Okabe; Ryosuke Tomita; Hideaki Yamaguchi, all of Yamaguchi, Japan

[73] Assignee: Mitsui Petrochemical Industries, Ltd., Tokyo, Japan

[21] Appl. No.: 665,478

[22] Filed: Mar. 6, 1991

[30] Foreign Application Priority Data

| Mar. 6, 1990 | [JP] | Japan | 2-54148 |
| Mar. 6, 1990 | [JP] | Japan | 2-54149 |
| Mar. 6, 1990 | [JP] | Japan | 2-54150 |
| Mar. 6, 1990 | [JP] | Japan | 2-54152 |
| Mar. 8, 1990 | [JP] | Japan | 2-57281 |

[51] Int. Cl.$^5$ ............ C08F 232/04; C08F 2/06
[52] U.S. Cl. ............ 526/281; 526/88; 526/169.2; 526/282; 526/280; 528/482; 528/502
[58] Field of Search ............ 526/88, 281, 169.2, 526/282, 280; 528/482, 502

[56] References Cited

U.S. PATENT DOCUMENTS 5,115,052  5/1992  Wamura et al. ............ 526/281 X

FOREIGN PATENT DOCUMENTS

| 0203799 | 3/1986 | European Pat. Off. | 526/281 |
| 0310394 | 5/1989 | European Pat. Off. | 526/281 |
| 0325260 | 7/1989 | European Pat. Off. | 526/281 |

*Primary Examiner*—Fred Teskin
*Attorney, Agent, or Firm*—Sherman and Shalloway

[57] ABSTRACT

In accordance with the present invention, there are provided cycloolefin random copolymers composed of ethylene and cycloolefin and containing substantially no polyethylene, and processes for preparing the same. Optical disc substrates prepared from the above-mentioned copolymers are excellent in transparency and also capable of minimizing the occurence of errors in reading of the discs due to quality of the substrates used therefor.

7 Claims, No Drawings

CYCLOOLEFIN RANDOM COPOLYMER AND PROCESS FOR PREPARING SAME

FIELD OF THE INVENTION

This invention relates to cycloolefin random copolymers. More particularly, the invention relates to cycloolefin random copolymers which, when used as a substrate for an optical disc, are capable of minimizing the disc's errors in reading due to quality of the substrate.

In another aspect, the invention relates to processes for preparing cycloolefin random copolymers. More particularly, the invention relates to processes for cycloolefin random copolymers, by which the content of polyethylene contained as an impurity in the resulting copolymer can be minimized, and cycloolefin random copolymers excellent in transparency can be prepared.

BACKGROUND OF THE INVENTION

Cycloolefin random copolymers composed of ethylene and specific bulky cycloolefins are synthetic resins which are well balanced among optical quality, mechanical properties and thermal properties, and are used in the field of optical materials such as optical memory disc and optical fiber.

When an optical memory disc is prepared from such cycloolefin random copolymer as mentioned above, however, the disc, even on rare occasions, commits an error in reading. The present inventors extensively researched with the view of minimizing an error in reading of the optical memory disc prepared from the cycloolefin random copolymer, and eventually have found that polyethylene formed as a by-product during the copolymerization and contained as an impurity in said cycloolefin random copolymer causes in part this error in reading. The present invention has thus been accomplished on the basis of this finding.

On the one hand, it is strongly desired that a process for preparing cycloolefin random copolymers is developed to make their appearance, by which the content of polyethylene contained as an impurity in the resulting copolymers can be decreased.

In this connection, the cycloolefin random copolymers referred to above have heretofore been prepared by copolymerization of ethylene and cycloolefin in the presence of a catalyst formed from a soluble vanadium compound and an organoaluminum compound using hydrocarbon such as cyclohexane or toluene, or the above-mentioned cycloolefin as a solvent. The present inventors extensively prosecuted research with the view of inventing a process for preparing cycloolefin random copolymers which have been reduced in content of polyethylene contained as an impurity and which are excellent in transparency, and eventually have found that the desired process can be attained by copolymerizing ethylene and cycloolefin under specific conditions or subjecting the copolymer solution obtained to specific operation.

OBJECT OF THE INVENTION

The present invention has been made in view of the prior art as mentioned above, and an object of the invention is to provide cycloolefin random copolymers having such excellent optical properties that when they are used as a substrate for an optical disc, an error of the disc in reading due to quality of the substrate can be minimized.

A further object of the invention is to provide processes for preparing cycloolefin random copolymers, by which the content of polyethylene contained as an impurity in the resulting copolymer can be decreased, and the cycloolefin random copolymers excellent in transparency can be prepared efficiently.

SUMMARY OF THE INVENTION

The cycloolefin random copolymers of the present invention are characterized in that they are copolymers of (a) ethylene and (b) at least one member selected from the group consisting of unsaturated monomers represented by the formula [I] or [II] mentioned below, and do not substantially contain polyethylene.

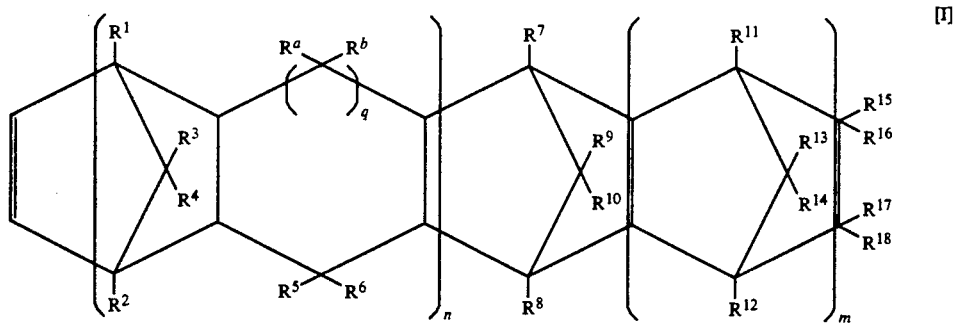

wherein n is 0 or 1, m is 0 or an integer of a positive number, q is 0 or 1, $R^1 \sim R^{18}$ and $R^a$, $R^b$ are each hydrogen atom, halogen atom or a hydrocarbon residue, $R^{15}$–$R^{18}$, linked with one another, may form a monocyclic ring or polycyclic ring which may have a double bond, $R^{15}$ and $R^{16}$ or $R^{17}$ and $R^{18}$ may together form an alkylidene group.

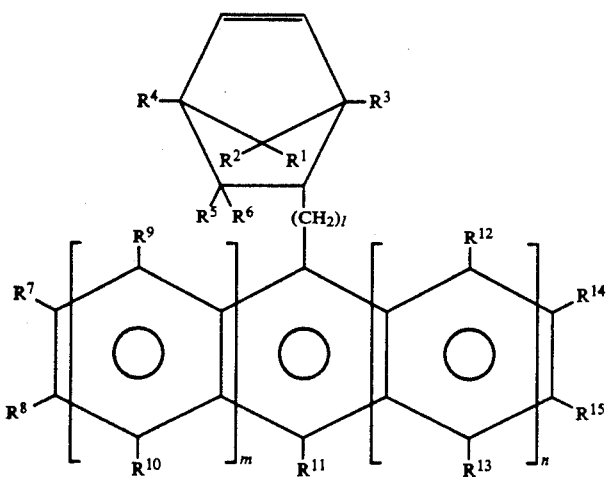

[II]

wherein 1 is 0 or an integer of more than 1, m and n are each 0, 1 or 2, $R^1 \sim R^{15}$ are each hydrogen atom, halogen atom, an aliphatic hydrocarbon residue, an aromatic hydrocarbon residue or an alkoxy group, $R^5$ (or $R^6$) and $R^9$ (or $R^7$) may link together through an alkylene group of 1-3 carbon atoms or may link together directly without through any group.

The first process for the preparation of the cycloolefin random copolymers of the present invention by copolymerization of (a) ethylene and (b) at least one cycloolefin selected from the group consisting of unsaturated monomers represented by the aforementioned formula [I] or [II] in a hydrocarbon solvent or in the liquid phase consisting of the above-mentioned cycloolefin in the presence of a catalyst formed from a soluble vanadium compound and an organoaluminum compound, is characterized in that the process involves an operation which comprises separating and removing a very small amount of solid polyethylene formed during the copolymerization as a side reaction product from the resulting cycloolefin copolymer solution.

The second process for the preparation of cycloolefin random copolymers of the invention by copolymerization of (a) ethylene and (b) at least one cycloolefin selected from the group consisting of unsaturated monomers represented by the aforementioned formula [I] or [II] in a hydrocarbon solvent or in the liquid phase consisting of the above-mentioned cycloolefin in the presence of a catalyst formed from a soluble vanadium compound and an organoaluminum compound, is characterized in that the $(C_{0Al}/C_{1Al})$ ratio of a concentration $(C_{0Al})$ of the organoaluminum compound to be fed to a reactor to a concentration $(C_{1Al})$ of the organoaluminum compound present in the reactor is not more than 11, and the ratio $(C_{0V}/C_{1V})$ of a concentration $(C_{0V})$ of the vanadium compound to be fed to a reactor to a concentration $(C_{1V})$ of the vanadium compound present in the reactor is not more than 3.

The third process for the preparation of cycloolefin random copolymer of the invention by copolymerization of (a) ethylene and (b) at least one cycloolefin selected from the group consisting of unsaturated monomers represented by the aforementioned formula [I] or [II] in a hydrocarbon solvent or in the liquid phase consisting of the above-mentioned cycloolefin in the presence of a catalyst formed from a soluble vanadium compound and an organoaluminum compound, is characterized in that ethylene and the above-mention cycloolefin are copolymerized while mixing and stirring the reaction solution by means of a stirring power of more than 2.7 KW/KL.

The fourth process for the preparation of cycloolefin random copolymers of the invention by copolymerization of (a) ethylene and (b) at least one cycloolefin selected from the group consisting of unsaturated monomers represented by the aforementioned formula [I] or [II] in a hydrocarbon solvent or in the liquid phase consisting of the above-mentioned cycloolefin in the presence of a catalyst formed from a soluble vanadium compound and an organoaluminum compound, is characterized in that an organoaluminum compound represented by the formula $$R_n Al Cl_{3-n}$$

wherein n is $1.35 \sim 1.65$, and R is a straight chain or branched alkyl group having 4 or more carbon atoms, is used as the organoaluminum compound.

The copolymers of ethylene and cycloolefin provided according to the present invention do not substantially contain polyethylene, and hence they are excellent in optical properties. When an optical disc is prepared from the copolymer of the invention used as a substrate therefor, an error in reading of the disc due to quality of the substrate can be minimized.

Furthermore, in accordance with the processes of the invention there can be prepared cycloolefin random copolymers in which the content of polyethylene contained as an impurity in the resulting copolymers has been reduces, and which are excellent in transparency. Moreover, it is possible to efficiently prevent the inner wall of a reactor and a portion in the vicinity of an outlet for polymer solution from sticking of solid polymers such as polyethylene.

DETAILED DESCRIPTION OF THE INVENTION

The cycloolefin random copolymers of the present invention are illustrated below in detail.

In the present invention, there are provided such cycloolefin random copolymer as prepared by copolymerization of cycloolefins represented by the aforementioned general formula [I] or [II], which are characterized by containing substantially no polyethylene.

In the present specification, by the expression "The cycloolefin random copolymers prepared by copolymerization of the above-mentioned cycloolefins and ethylene do not contain substantially no polyethylene." is means the following fact. That is, it means the fact that when a polymer solution prepared by dissolving a cycloolefin random copolymer in cyclohexane in an amount of 20~40 g/l is passed through a fluororesin filter, the amount of a solid polyethylene remained thereon is not more than 6 ppm, preferably not more than 5 ppm of the weight of said cycloolefin random copolymer, said fluororesin filter being such that its film thickness is about 40 μm, its average pore diameter as measured by the mercury injection method is 0.4~0.5 μm, its maximum pore diameter as measured by the bubble point method (ASTM F 316-70) is about 1 μm, and its flow behavior (when ethyl alcohol (viscosity 1.09 cp) kept at 25° C. is passed therethrough) is 15~17 l/min when a differential pressure employed is 0.05 kg/cm² as measured by employing a filtering surface area of 0.87 m², 28~32 l/min when said differential pressure is 0.1 kg/cm², and 48~52 l/min when said differential pressure is 0.2 kg/cm².

At the time when the polymer solution is passed through the filter, the filtration temperature employed is 30°~40° C., the differential pressure is not more than 1.6 kg/cm², and the flow rate of the polymer solution is about 300 kg/hr·m².

The solid polyethylene recovered by the above-mentioned filtration is identified as an ethylene homopolymer or an ethylene/cycloolefin random copolymer containing structural units derived from ethylene of more than 90 mol %, usually more than 95 mol % and has a peak of melting point as measured by DSC method of more than 50° C.

The cycloolefin random copolymer containing substantially no polyethylene is substantially soluble in cyclohexane.

Examples of the cycloolefin of the aforementioned general formula [I] used in the present invention include bicyclo[2.2.1]hepto-2-ene derivatives; tetracyclo[4.4.0.1$^{2,5}$.1$^{7,10}$]-3-dodecene derivatives; hexacyclo[6.6.1.1$^{3,6}$.1$^{10,13}$.0$^{2,7}$.0$^{9,14}$]-4-heptadecene derivatives; octacyclo[8 8.0.1$^{2,9}$.1$^{4,7}$.1$^{11,18}$.1$^{13,16}$.0$^{3,8}$.0$^{12,17}$]-5-docosene derivatives; pentacyclo[6.6.1.1$^{3,6}$.0$^{2,7}$0$^{9,14}$]-4-hexadecene derivatives; heptacyclo-5-eicosene derivatives; heptacyclo-5-heneicosene derivatives; tricyclo[4.3.0.1$^{2,5}$]-3-decene derivatives; pentacyclo[6.5.1.1$^{3,6}$.0$^{2,7}$.0$^{9,13}$]-4-pentadecene derivatives; pentacyclopentadecadiene derivatives; pentacyclo[4.7.0.1$^{2,5}$.0$^{8,13}$.1$^{9,12}$]-3-pentadecene derivatives; pentacyclo[7.8.0.1$^{3,6}$.0$^{2,7}$.1$^{10,17}$.0$^{11,16}$.1$^{12,15}$]-4-eicosene derivatives nonacyclo[9.10.1.1.4.7.0$^{3,6b}$.0$^{2,10}$.0$^{12,21}$.1$^{13,20}$.0$^{14,19}$.1$^{15,18}$]-5-pentacosene derivatives, pentacyclo[8.4.0.1$^{2,5}$.1$^{9,12}$.0$^{8,13}$]-3-hexadecene derivatives, heptacyclo[8.8.0.1$^{4,7}$.1$^{11,18}$.1$^{13,16}$.0$^{3,8}$.0$^{12,17}$]-5-heneicosene derivatives, and nonacyclo[10.10.1.1$^{5,8}$.1$^{14,21}$.1$^{16,19}$.0$^{2,11}$.0$^{4,9}$.0$^{13,22}$.0$^{15,20}$]-5-hexacosene derivatives Listed below are concrete examples of the compounds mentioned above.

The bicyclo[2.2.1]hept-2-ene derivatives such as

Bicyclo[2.2.1]hept-2-ene

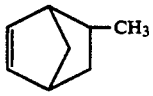

6-Methylbicyclo[2.2.1]hept-2-ene

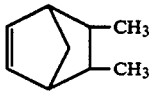

5,6-Dimethylbicyclo[2.2.1]-hept-2-ene

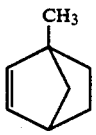

1-Methylbicyclo[2.2.1]hept-2-ene

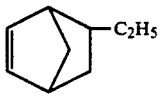

6-Ethylbicyclo[2.2.1]hept-2-ene

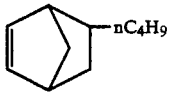

6-n-Butylbicyclo[2.2.1]hept-2-ene

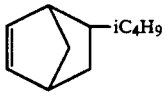

6-Isobutylbicyclo[2.2.1]hept-2-ene

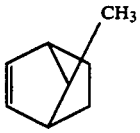

7-Methylbicyclo[2.2.1]hept-2-ene;

the tetracyclo[4.4.0.1$^{2,5}$.1$^{7,10}$]-3-dodecene derivatives such as

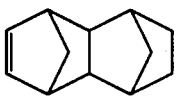

Tetracyclo[4.4.0.1$^{2,5}$.1$^{7,10}$]-3-dodecene

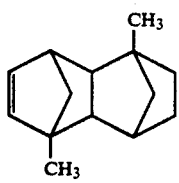

5,10-Dimethyltetracyclo-
[4.4.0.1$^{2,5}$.1$^{7,10}$]-3-dodecene

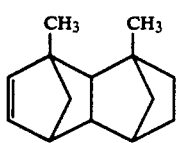

2,10-Dimethyltetracyclo-
[4.4.0.1$^{2,5}$.1$^{7,10}$]-3-dodecene

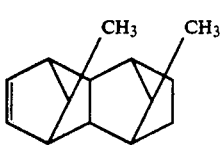

11,12-Dimethyltetracyclo-
[4.4.0.1$^{2,5}$.1$^{7,10}$]-3-dodecene

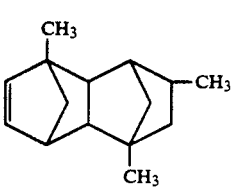

2,7,9-Trimethyltetracyclo-
[4.4.0.1$^{2,5}$.1$^{7,10}$]-3-dodecene

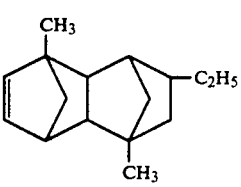

9-Ethyl-2,7-dimethyltetracyclo-
[4.4.0.1$^{2,5}$.1$^{7,10}$]-3-dodecene

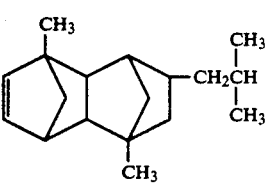

9-Isobutyl-2,7-dimethyltetracyclo-
[4.4.0.1$^{2,5}$.1$^{7,10}$]-3-dodecene

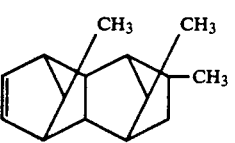

9,11,12-Trimethyltetracyclo-
[4.4.0.1$^{2,5}$.1$^{7,10}$]-3-dodecene

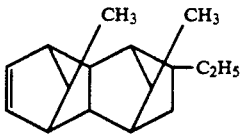

9-Ethyl-11,12-dimethyltetracyclo-
[4.4.0.1$^{2,5}$.1$^{7,10}$]-3-dodecene

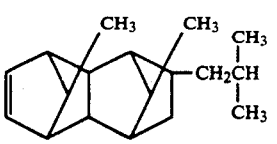

9-Isobutyl-11,12-dimethyltetracyclo-
[4.4.0.1$^{2,5}$.1$^{7,10}$]-3-dodecene

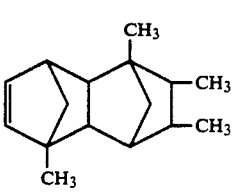

5,8,9,10-Tetramethyltetracyclo-
[4.4.0.1$^{2,5}$.1$^{7,10}$]-3-dodecene

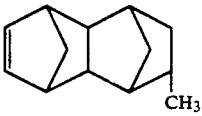

8-Methyltetracyclo-
[4.4.0.1$^{2,5}$.1$^{7,10}$]-3-dodecene

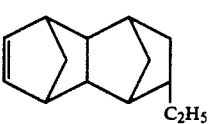

8-Ethyltetracyclo-
[4.4.0.1$^{2,5}$.1$^{7,10}$]-3-dodecene

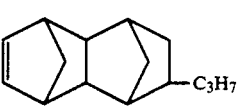

8-Propyltetracyclo-
[4.4.0.1$^{2,5}$.1$^{7,10}$]-3-dodecene

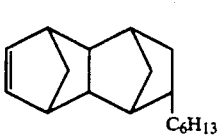

8-Hexyltetracyclo-
[4.4.0.1$^{2,5}$.1$^{7,10}$]-3-dodecene

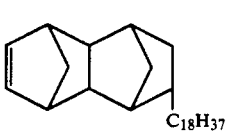

8-Stearyltetracyclo-
[4.4.0.1$^{2,5}$.1$^{7,10}$]-3-dodecene

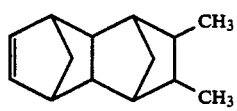

8,9-Dimethyltetracyclo-
[4.4.0.1$^{2,5}$.1$^{7,10}$]-3-dodecene

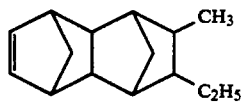

8-Methyl-9-ethyltetracyclo-
[4.4.0.1$^{2,5}$.1$^{7,10}$]-3-dodecene

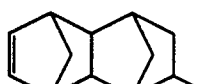

8-Chlorotetracyclo-
[4.4.0.1$^{2,5}$.1$^{7,10}$]-3-dodecene

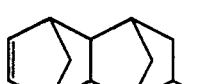

8-Bromotetracyclo-
[4.4.0.1$^{2,5}$.1$^{7,10}$]-3-dodecene

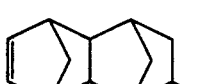

8-Fluorotetracyclo-
[4.4.0.1$^{2,5}$.1$^{7,10}$]-3-dodecene

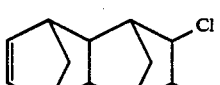

8,9-Dichlorotetracyclo-
[4.4.0.1$^{2,5}$.1$^{7,10}$]-3-dodecene

8-Cyclohexyltetracyclo-
[4.4.0.1$^{2,5}$.1$^{7,10}$]-3-dodecene

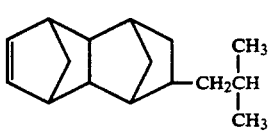

8-Isobutyltetracyclo-
[4.4.0.1$^{2,5}$.1$^{7,10}$]-3-dodecene

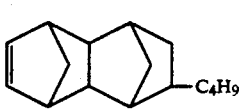

8-Butyltetracyclo-
[4.4.0.1$^{2,5}$.1$^{7,10}$]-3-dodecene

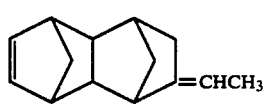

8-Ethylidenetetracyclo-
[4.4.0.1$^{2,5}$.1$^{7,10}$]-3-dodecene

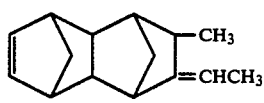

8-Ethylidene-9-methyltetracyclo-
[4.4.0.1$^{2,5}$.1$^{7,10}$]-3-dodecene

8-Ethylidene-9-ethyltetracyclo-
[4.4.0.1$^{2,5}$.1$^{7,10}$]-3-dodecene

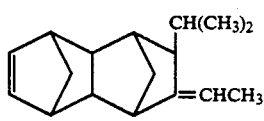

8-Ethylidene-9-isopropyltetracyclo-
[4.4.0.1$^{2,5}$.1$^{7,10}$]-3-dodecene

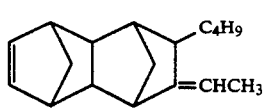

8-Ethylidene-9-butyltetracyclo-
[4.4.0.1$^{2,5}$.1$^{7,10}$]-3-dodecene

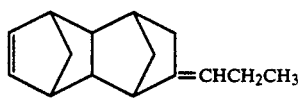

8-n-Propylidenetetracyclo-
[4.4.0.1$^{2,5}$.1$^{7,10}$]-3-dodecene

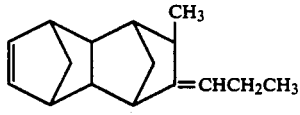

8-n-Propylidene-9-methyltetracyclo-
[4.4.0.1$^{2,5}$.1$^{7,10}$]-3-dodecene

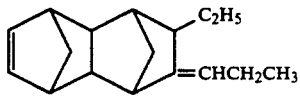

8-n-Propylidene-9-ethyltetracyclo-
[4.4.0.1$^{2,5}$.1$^{7,10}$]-3-dodecene

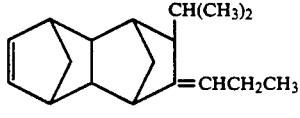

8-n-Propylidene-9-isopropyltetracyclo-
[4.4.0.1$^{2,5}$.1$^{7,10}$]-3-dodecene

-continued

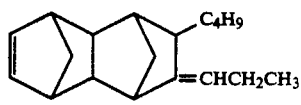

8-n-Propylidene-9-butyltetracyclo-
[4.4.0.1²,⁵.1⁷,¹⁰]-3-dodecene

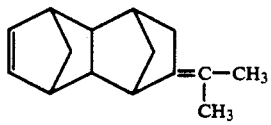

8-Isopropylidenetetracyclo-
[4.4.0.1²,⁵.1⁷,¹⁰]-3-dodecene

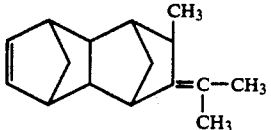

8-Isopropylidene-9-methyltetracyclo-
[4.4.0.1²,⁵.1⁷,¹⁰]-3-dodecene

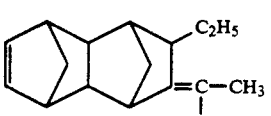

8-Isopropylidene-9-ethyltetracyclo-
[4.4.0.1²,⁵.1⁷,¹⁰]-3-dodecene

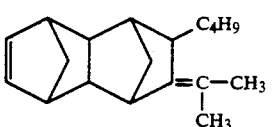

8-Isopropylidene-9-isopropyltetracyclo-
[4.4.0.1²,⁵.1⁷,¹⁰]-3-dodecene

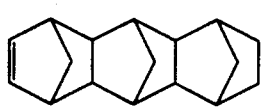

8-Isopropylidene-9-butyltetracyclo-
[4.4.0.1²,⁵.1⁷,¹⁰]-3-dodecene;

the hexacyclo[6.6.1.1³,⁶.1¹⁰,¹³.0²,⁷.0⁹,¹⁴]-4-heptadecene derivatives such as

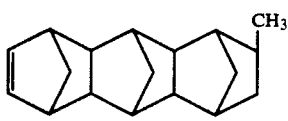

Hexacyclo[6.6.1.1³,⁶.1¹⁰,¹³.0²,⁷.0⁹,¹⁴]-4-heptadecene

12-Methylhexacyclo[6.6.1.1²,⁶.1¹⁰,¹³.0²,⁷.0⁹,¹⁴]-4-heptadecene

-continued

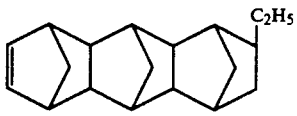

12-Ethylhexacyclo[6.6.1.1³,⁶.1¹⁰,¹³.0²,⁷.0⁹,¹⁴]-4-heptadecene

12-Isobutylhexacyclo[6.6.1.1³,⁶.1¹⁰,¹³.0²,⁷.0⁹,¹⁴]-4-heptadecene

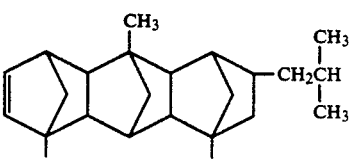

1,6,10-Trimethyl-12-isobutylhexacyclo[6.6.1.1³,⁶.1¹⁰,¹³.0²,⁷.0⁹,¹⁴]-4-heptadecene the octacyclo[8.8.0.1²,⁹.1⁴,⁷.1¹¹,¹⁸.1¹³,¹⁶.0³,⁸.0¹²,¹⁷]-5-docosene derivatives such as

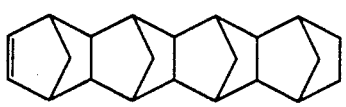

Octacyclo[8.8.0.1²,⁹.1⁴,⁷.1¹¹,¹⁸.1¹³,¹⁶.0³,⁸.0¹²,¹⁷]-5-docosene

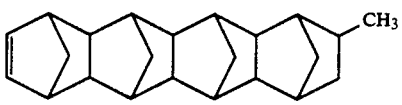

15-Methyloctacyclo[8.8.0.1²,⁹.1⁴,⁷.1¹¹,¹⁸.0³,⁸.0¹²,¹⁷]-5-docosene

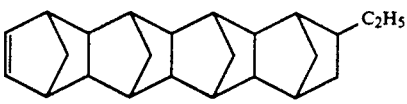

15-Ethyloctacyclo-
[8.8.0.1²,⁹.1⁴,⁷.1¹¹,¹⁸.1¹³,¹⁶.0³,⁶.0¹²,¹⁷]-5-docosene;

the pentacyclo[6,6,1,1³,⁶,0²,⁷,0⁹,¹⁴]-4-hexadecene derivatives such as

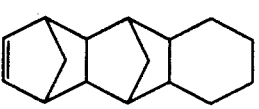

Pentacyclo[6,6,1,1³,⁶,0²,⁷,0⁹,¹⁴]-4-hexadecene

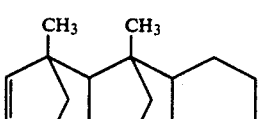

1,3-Dimethylpentacyclo-
[6,6,1,1³,⁶,0²,⁷,0⁹,¹⁴]-4-hexadecene

-continued

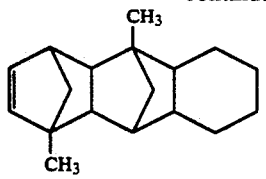
1,6-Dimethylpentacyclo-
[6,6,1,1$^{3,6}$, 0$^{2,7}$, 0$^{9,14}$]-4-hexadecene

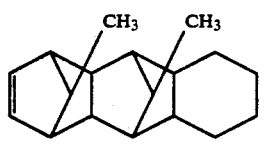
15,16-Dimetylpentacyclo-
[6,6,1,1$^{3,6}$, 0$^{2,7}$,0$^{9,14}$]-4-hexadecene;

the heptacyclo-5-eicosene derivatives or heptacyclo-5-heneicosene derivatives such as

Heptacyclo [8.8.0.1$^{2,9}$.1$^{4,7}$.1$^{11,17}$.0$^{3,8}$.0$^{12,16}$]-5-eicosene

Heptacyclo [8.8.0.1$^{2,9}$.1$^{4,7}$.1$^{11,18}$.0$^{3,6}$.0$^{12,17}$]-5-heneicosene the tricyclo[4,3,0,1$^{2,5}$]-3-decene derivatives such as

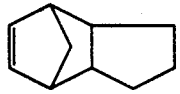
Tricyclo [4.3.0.1$^{2,5}$]-3-decene

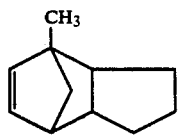
2-Methyltricyclo[4.3.0.1$^{2,5}$]-3-decene

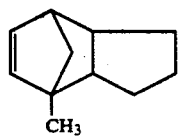
5-Methyltricyclo[4.3.0.1$^{2,5}$]—3—decene;

the tricyclo[4.4.0.1$^{2,5}$]-3-undecene derivatives such as

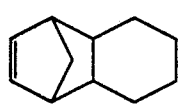
Tricyclo[4.4.0.1$^{2,5}$]-3-undecene

-continued

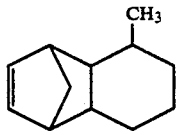
10-Methyl-tricyclo[4.4.0.1$^{2,5}$]-3-undecene the pentacyclo[6.5.1.1$^{3,6}$.0$^{2,7}$.0$^{9,13}$]-4-pentadecene derivatives such as

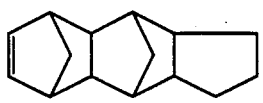
Pentacyclo [6.5.1.1$^{3,6}$.0$^{2,7}$.0$^{9,13}$]-4-pentadecene

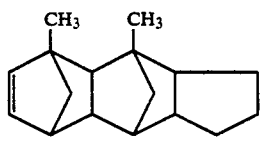
1,3-Dimethylpentacyclo-
[6.5.1.1$^{3,6}$.0$^{2,7}$.0$^{9,13}$]-4-pentadecene

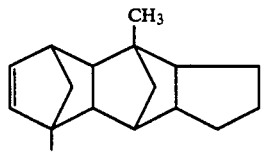
1,6-Dimethylpentacyclo-
[6.5.1.1$^{3,6}$.0$^{2,7}$.0$^{9,13}$]-4-pentadecene

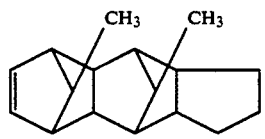
14,15-Dimethylpentacyclo[6.5.1.1$^{3,6}$.0$^{2,7}$.0$^{9,13}$]-4-pentadecene;

the diene compounds such as

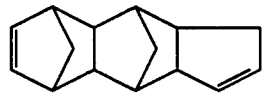
Pentacyclo]6.5.1.1$^{3,6}$.0$^{2,7}$.0$^{9,13}$]-4,10-pentadecadiene;

the pentacyclo[4.7.0.1$^{2,5}$.0$^{8,13}$.0$^{9,12}$]-3-pentadecene derivatives such as

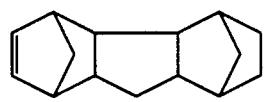
Pentacyclo[4.7.0.1$^{2,5}$.0$^{8,13}$.0$^{9,12}$]-3-pentadecene

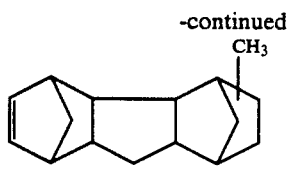

Methyl-substituted pentacyclo[4.7.0.1$^{2,5}$.0$^{8,13}$.0$^{9,12}$]-3-pentadecene;

the heptacyclo[7,8,0,1$^{3,6}$,0$^{2,7}$,1$^{10,17}$,0$^{11,16}$,1$^{12,15}$]-4-eicosene derivatives such as

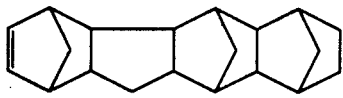

Heptacyclo[7.8.0.1$^{3,6}$.0$^{2,7}$.1$^{10,17}$.0$^{11,16}$.1$^{12,15}$]-4-eicosene

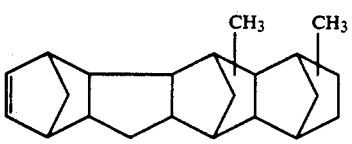

Dimethyl-substituted heptacyclo-[7.8.0.1$^{3,6}$.0$^{2,7}$.1$^{10,17}$.0$^{11,16}$.1$^{12,15}$]-4-eicosene; and the nonacyclo[9.10.1.1$^{4,7}$.0$^{3,8}$.1$^{2,10}$.0$^{12,21}$.1$^{13,20}$.0$^{14,19}$.1$^{15,18}$]-5-pentacosene derivatives such as

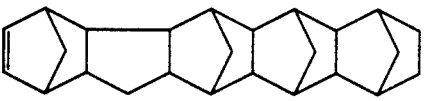

Nonacyclo[9.10.1.1$^{4,7}$.0$^{3,8}$.1$^{2,10}$.0$^{12,21}$.1$^{13,20}$.0$^{14,19}$.1$^{15,18}$]-5-pentacosene

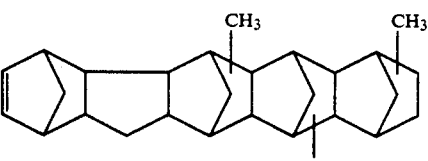

Trimethyl-substituted-nonacyclo-[9.10.1.1$^{4,7}$.0$^{3,8}$.1$^{2,10}$.0$^{12,21}$.1$^{13,20}$.0$^{14,19}$.1$^{15,18}$]-5-pentacosene.

The cycloolefin of the aforementioned general formula [II] used in the present invention includes concretely such compounds as listed herein below.

The Pentacyclo [8.4.0.1$^{2,5}$.1$^{9,12}$.0$^{8,13}$]-3-hexadecene derivatives such as

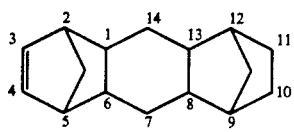

Pentacyclo [8.4.0.1$^{2,5}$.1$^{9,12}$.0$^{8,13}$]-3-hexadecene

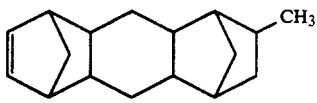

11-Methylpentacyclo [8.4.0.1$^{2,5}$.1$^{9,12}$.0$^{8,13}$]-3-hexadecene

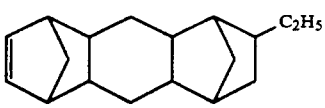

11-Ethylpentacyclo [8.4.0.1$^{2,5}$.1$^{9,12}$.0$^{8,13}$]-3-hexadecene

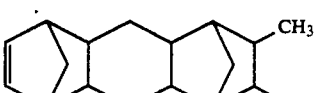

10,11-Dimethylpentacyclo [8.4.0.1$^{2,5}$.1$^{9,12}$.0$^{8,13}$]-3-hexadecene

The heptacyclo [8.8.0.1$^{4,7}$.1$^{11,18}$.1$^{13,16}$.0$^{3,8}$.0$^{12,17}$]-5-heneicosene derivatives such as

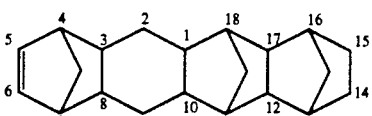

Heptacyclo [8.8.0.1$^{4,7}$.1$^{11,18}$.1$^{13,16}$.0$^{3,8}$.0$^{12,17}$]-5-heneiocosene

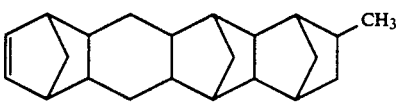

15-Methylheptacyclo [8.8.0.1$^{4,7}$.1$^{11,18}$.1$^{13,16}$.0$^{3,8}$.0$^{12,17}$]-5-heneicosene

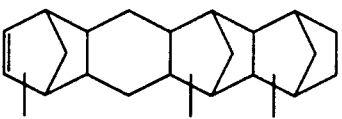

Trimethyl-substituted-heptacyclo ]8.8.0.1 $^{4,7}$.1$^{11,18}$.1$^{13,16}$.0$^{3,8}$.0$^{12,17}$]-5-heneicosene The nonacyclo [10.10.1.1$^{5,8}$.1$^{14,21}$.1$^{16,19}$.0$^{2,11}$.0$^{4,9}$.0$^{13,22}$.0$^{15,20}$]-6-hexacosene derivatives such as

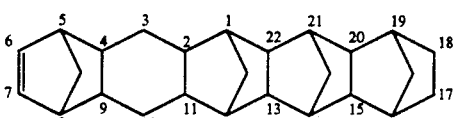

Nonacyclo [10.10.1.1$^{5,8}$.1$^{14,21}$.1$^{16,19}$.0$^{2,11}$.0$^{4,9}$.0$^{13,22}$.0$^{15,20}$]-6-hexacosene -continued

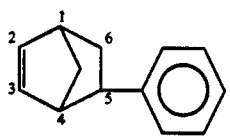

5-Phenyl-bicyclo[2.2.1]hept-2-ene

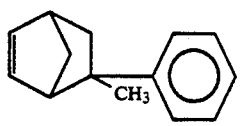

5-Methyl-5-phenyl-bicyclo[2.2.1]-hept-2-ene

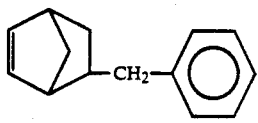

5-Benzyl-bicyclo[2.2.1]hept-2-ene

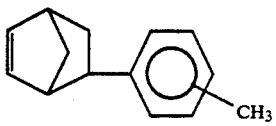

5-Tolyl-bicyclo[2.2.1]hept-2-ene

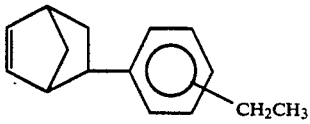

5-(Ethylphenyl)-bicyclo[2.2.1]hept-2-ene

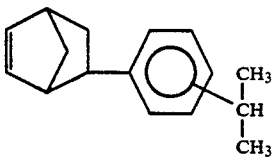

5-(Isopropylphenyl)-bicyclo[2.2.1]-hept-2-ene

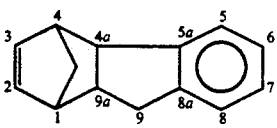

1,4-Methano-1,4,4a,9a-tetrahydro-fluorene

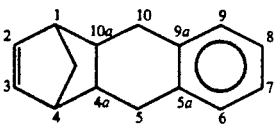

1,4-Methano-1,4,4a,5,10,10a-hexahydroanthracene

-continued

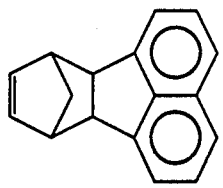

Cyclopentadiene-acenaphthylene addition product

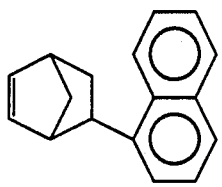

5-(α-Naphthyl)-bicyclo[2.2.1]hept-2-ene

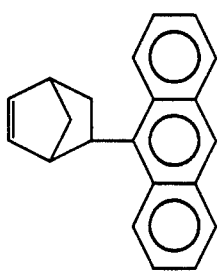

5-(Acetolacenyl)-bicyclo[2.2.1]hept-2-ene

The cycloolefins represented by the aforementioned formula [I] may be prepared easily by Diels-Alder reaction of cyclopentadienes with corresponding olefins.

The processes for the preparation of cycloolefin random copolymers of the present invention are illustrated below with reference to one example thereof.

In carrying out copolymerization of ethylene and cycloolefins according to the invention, Ziegler type catalysts containing transition metals such as vanadium (V), zirconium (Zr) and titanium (Ti) can be used. In that case, however, particularly useful catalysts are those formed from soluble vanadium compounds and organoaluminum compounds.

Useful vanadium compounds are concretely those represented by the general formula $VO(OR)_aX_b$ or $V(OR)_cX_d$, wherein X is halogen, R is a hydrocarbon residue, $0 \leq a \leq 3$, $0 \leq b \leq 3$, $2 \leq a+b \leq 3$, $0 \leq c \leq 4$, $0 \leq d \leq 4$, and $323 \, c+d \leq 4$, or adducts of these compounds with electron donors. More concretely, these vanadium compounds include $VOCl_3$, $VO(OC_2H_5)Cl_2$, $VO(OC_2H_5)_2Cl$, $VO(O\text{-}iso\text{-}C_3H_7)Cl_2$, $VO(O\text{-}n\text{-}C_4H_9)Cl_2$, $VO(OC_2H_5)_3$, $VOBr_2$, $VCl_4$, $VOCl_2$, $VO(O\text{-}n\text{-}C_4H_9)_3$ and $VCl_3 \cdot 20C_8H_{17}OH$.

The electron donors which are sometimes used in preparing the soluble vanadium catalyst component include alcohols, phenols, ketones, aldehydes, esters, ethers, acid amides or acid anhydrides of carboxylic acids, organic acids or inorganic acids, oxygen containing electron donors such as alkoxysilane, and nitrogen containing electron donors such as ammonia, amine, nitrile and isocyanate. More concretely, these electron donors include alcohols of 1~18 carbon atoms such as methanol, ethanol, propanol, pentanol, hexanol, octanol, dodecanol, octadecyl alcohol, oleyl alcohol, benzyl alcohol, phenylethyl alcohol, cumyl alcohol, isopropyl alcohol and isopropylbenzyl alcohol; phenols of 6~20 carbon atoms, which may have a lower alkyl, such as phenol, cresol, xylene, ethylphenol, propylphenol, nonylphenol, cumylphenol and naphthol; ketones of 3~15 carbon atoms such as acetone, methyl ethyl ketone, methyl isobutyl ketone, acetophenone, benzophenone and benzoquinone; aldehydes of 2~15 carbon atoms such as acetaldehyde, propionaldehyde, octyl aldehyde, benzaldehyde, tolualdehyde and napthaldehyde; organic acid esters of 2~30 carbon atoms such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl dichloroacetate, methyl methacrylate, ethyl crotonate, ethyl cyclohexylcarboxylate, methyl benzoate, ethyl benzoate, propyl benzoate, butyl benzoate, octyl benzoate, cyclohexyl benzoate, phenyl benzoate, benzyl benzoate, methyl toluylate, ethyl toluylate, amyl toluylate, ethyl ethylbenzoate, methyl anisate, n-butyl maleate, diisobutyl methylmalonate, di-n-hexyl cyclohexenecarboxylate, diethyl nadiate, diisopropyl tetrahydrophthalate, diethyl phthalate, diisobutyl phthalate, di-n-butyl phthalate, di-2-ethylhexyl phthalate, γ-butyrolactone, δ-valerolactone, coumarin, naphthalide and ethylene carbonate; acid halides of 2~15 carbon atoms such as acetyl chloride, benzoyl chloride, tolylic acid chloride and anisic acid chloride; ethers of 2~20 carbon atoms such as methyl ether, ethyl ether, isopropyl ether, butyl ether, amyl ether, tetrahydrofuran, anisole and diphenyl ether; acid amides such as acetic acid amide, benzoic acid amide and toluylic acid amide; amines such as methylamine, ethylamine, diethylamine, tributylamine, piperidine, tribenzylamine, aniline, pyridine, picoline and tetramethylenediamine; nitriles such as acetonitrile, benzonitril and tolunitrile; and alkoxysilanes such as ethyl silicate, and diphenyldimethoxysilane. These electron donors may be used in admixture of two or more.

Useful organoaluminum compounds are those having in the molecule at least one Al-carbon bond, for example, (i) organoaluminum compounds represented by the general formula $R^1_mAl(OR^2)_nH_pX_q$ wherein $R^1$ and $R^2$, which may be the same or different, are each a hydrocarbon residue of 1~15 carbon atoms, preferably 1~4 carbon atoms, X is halogen, m is $0 \leq m \leq 3$, n is $0 \leq n \leq 3$, p is $0 \leq p \leq 3$, q is $0 \leq q \leq 3$, and m+n+p+q=3, and (ii) complex alkylation products of metals belonging to the Group I of the periodic table with aluminum represented by the general formula $M^1 Al R^1_4$ wherein $M^1$ is Li, Na or K, and $R^1$ is as defined above.

The organoaluminum compounds referred to in the foregoing (i) include, for example, those represented by the following general formulas.

$R^1_mAl(OR^2)_{3-m}$ wherein $R^1$ and $R^2$ are as defined above, and m is preferably $1.5 \leq m \leq 3$, $R^1_mAl X_{3-m}$ wherein $R^1$ is as defined above, X is halogen, and m is preferably $0 \leq m \leq 3$, $R^1_mAl H_{3-m}$ wherein $R^1$ is as defined above, and m is preferably $2 \leq m \leq 3$, $R^1_mAl(OR^2)_n X_q$ wherein $R^1$ and $R^2$ are as defined above, X is halogen, $0 < m \leq 3$, $0 \leq n \leq 3$, $0 \leq q < 3$, and m+n+q=3.

The aluminum compounds belonging to the (i) include more concretely ① trialkylaluminum such as triethylaluminum and tributylaluminum; trialkenylaluminum such as trisoprophepnylaluminum; dialkylaluminum alkoxides such as diethylaluminum ethoxide and dibutylaluminum butoxide; alkylaluminum sesquialkoxides such as ethylaluminum sesquiethoxide and butylaluminum sesquibutoxide; and partially alkylated alkylaluminum having an average composition represented by $R^1_{2.5}Al(OR^2)_{0.5}$, ② dialkylaluminumhalides such as diethylaluminum chloride, dibutylaluminum chloride and diethylaluminum bromide; alkylaluminum sesquihalides such as ethylaluminum sesquichloride, butylaluminum sesquichloride and ethylaluminum sesquibromide; partially halogenated alkylaluminum such as alkylaluminum dihalides, for example, ethylaluminum dichloride, propylaluminum dichloride and butylaluminum dibromide; ③ dialkylaluminum hydrides such as diethylaluminumhydride and dibutylaluminum hydride; partially hydrogenated alkylaluminum such as alkylaluminum dihydrides, for example, ethylaluminum dihydride and propylaluminum dihydride; and ④ partially alkoxylated and halogenated alkylaluminum such as ethylaluminum ethoxychloride, butylaluminum butoxychloride and ethylaluminum ethoxybromide. Compounds analogous to the compounds (i), for example, such organoaluminum compounds having two or more aluminum linked together through oxygen atom or nitrogen atom are also useful. Such compounds as mentioned above include concretely $(C_2H_5)_2AlOAl(C_2H_5)_2$, $(C_4H_5)_2AlOAl(C_4H_9)_2$ and

The compounds belonging to the foregoing (ii) include $LiAl(C_2H_5)_4$ and $LiAl(C_7H_{15})_4$. Of the organoaluminum compounds as illustrated above, particularly preferred are alkylaluminum halides alkylaluminum dihalides or mixtures thereof.

In copolymerizing ethylene and such cycloolefins as mentioned above in the present invention, hydrocarbon solvents can be used. Useful hydrocarbon solvents include aliphatic hydrocarbons such as pentane, hexane, heptane, octane, decane, dodecane and kerosine and halogen derivatives thereof; alicyclic hydrocarbons such as cyclohexane, methylcyclopentane and methylcyclohexane and halogen derivatives thereof; and aromatic hydrocarbons such as benzene, toluene and xylene and halogen derivatives thereof such as chlorobenzene.

In the present invention, ethylene and at least one of the aforementioned cycloolefins (represented by the general formula [I] or [II]), but, if necessary, α-olefins of more than 3 carbon atoms may be copolymerized therewith. Useful α-olefins having more than 3 carbon atoms include, for example, propylene, 1-butene, 4-methyl-1-pentene, 1-hexene, 1-octene, 1-decene, 1-dodecene, 1-tetradecene, 1-hexadecene, 1-octadecen and 1-eicosene.

If necessary, other copolymerizable unsaturated monomer components can also be copolymerized so long as they do not throw hinderances in the way of the objects of the present invention. Such copolymerizable monomers as referred to above include concretely cycloolefins such such as cyclopentene, cyclohexene, 3-methylcyclohexene and cyclooctene, and non-conjugated dienes such as 1,4-hexadiene, 4-methyl-1,4-hexadiene, 5-methyl-1,4-hexadiene, 1,7-octadiene, and dicyclopentadiene, which are used in amounts of less than equimolar with the aforementioned cycloolefin component units in the resulting random copolymer.

In preparing the cycloolefin random copolymers, it is preferable to carry out the copolymerization reaction between ethylene and the cycloolefins (represented by the general formula [I] or [II]) by the continuous method.

In that case, it is desirable that the ratio ($C_{OAl}/C_{1Al}$) of a concentration of the organoaluminum compound to be fed to a reactor ($C_{OAl}$) to a concentration of said organoaluminum compound present in said reactor ($C_{1Al}$) is not more than 50, preferably 11~1 and especially 9~1, and the ratio ($C_{OV}/C_{1V}$) of a concentration of the vanadium compound to be fed to a reactor ($C_{OV}$) to a concentration of said vanadium compound present in said reactor ($C_{1V}$) is not more than 10, preferably 3~1 and especially 2.5~1.

Usually, the soluble vanadium compound and the organoaluminum compound are each diluted with the aforementioned hydrocarbon solvents or cycloolefins and then fed to the reactor.

In the present invention, it is desirable that the ratio (Al/V) in the polymerization system of vanadium atom to aluminum atom is more than 2, preferably 2~50 and especially 3~20.

In a process of preparing the cycloolefin random copolymers, a concentration in the copolymerization reaction system of the soluble vanadium compound, in terms of vanadium atom, is usually 0.01~5 mmole/l, preferably 0.05~3 mmole/l.

The copolymerization reaction of ethylene with the cycloolefins illustrated above is carried out at a temperature of from −50° to 100° C., preferably from −30° to 80° C. and especially from −20° to 60° C.

The reaction time employed in the above-mentioned copolymerization (an average retention time of the polymerization reaction mixture when the reaction is carried out continuously), though varies according to the kind of monomers, and to the concentration and temperature of the catalyst components etc., is usually from 5 minutes to 5 hours, preferably from 10 minutes to 3 hours. The pressure employed at that time is usually over 0 to 50 kg/cm$^2$, preferably over 0 to 20 kg/cm$^2$. In carrying out the copolymerization, it is also possible that a chain transfer agent such as hydrogen is allowed to exist in the copolymerization system in order to modify the molecular weight of the resulting copolymer.

In a process for preparing the cycloolefin random copolymers, it is desirable that the molar ratio of ethylene/cycloolefin to be fed is from 85/15 to 15/85, preferably from 40/60 to 85/15.

When the copolymerization reaction of ethylene with cycloolefins is carried out in the manner mentioned above, a solution of the cycloolefin random copolymer is obtained. A concentration of the cycloolefin random copolymer contained in the copolymer solution obtained is usually 5~300 g/l, preferably 10~200 g/l.

A cycloolefin random copolymer containing substantially no polyethylene can be obtained by separating and removing a very small amount of solid polyethylene contained as a side reaction product from the cycloolefin random copolymer solution obtained above.

The solid polyethylene can be removed from the cycloolefin random copolymer solution containing the same, for example, by filtering the copolymer solution through a filter; subjecting said copolymer solution to centrifugal separation operation; removing the solid polyethylene by adsorption by diatomaceous earth, activated carbon or alumina; removing said solid polyethylene by utilizing such a membrane as a ultrafiltration membrane or a reverse osmosis membrane; suspending said copolymer solution, blowing a vapor thereinto, and removing said solid polyethylene attached to floating bubbles; heating said copolymer solution, quenching it to agglomerate said solid polyethylene to form a solid polyethylene having a larger particle diameter, and removing said solid polyethylene of a larger particle diameter by the above-mentioned procedure by means of spontaneous precipitation; and by maintaining said copolymer solution at a state of high temperature and humidity, separating said solution into a solution phase consisting essentially of the copolymer and a solution phase containing a greater part of molten polyethylene, and collecting only the former phase by separation.

The polyethylene resulting from the copolymerization of ethylene and cycloolefins is slightly soluble in a hydrocarbon solvent or cycloolefin solvent, and hence it is present as a microsolid in the copolymer solution obtained. On the other hand, the resulting cycloolefin random copolymer is in the form of solution in the hydrocarbon solvent or cycloolefin solvent. Accordingly, only the solid polyethylene can be removed from the copolymer solution containing the same by application of the procedures as mentioned above.

By polyethylene as used in the present specification is meant a homopolymer of ethylene, and in addition, a copolymer of ethylene and cycloolefin having the ethylene content of more than 90 mol %.

In the present invention, a very small amount of solid polyethylene contained as a side reaction product in the cycloolefin random copolymer solution resulting from the copolymerization of ethylene and cycloolefins carried out in the manner mentioned above is removed by the procedure as mention above, and hence the content of the polyethylene in the cycloolefin random copolymers obtained is decreased, and as a consequence, molded products obtained from said copolymers are improved in transparency.

The cycloolefin random copolymer solution, from which the solid polyethylene has been removed, is treated in the usual way to obtain the cycloolefin random copolymer as desired.

The cycloolefin random copolymers thus obtained do not have a DSC melting point, and from the measurement results obtained by X-ray diffraction, it is also found that the copolymers are suitably amorphous copolymers.

Further, the ethylene/cycloolefin molar ratio in the cycloolefin random copolymers obtained by the processes of the present invention is usually from 95/5 to 30/70, preferably from 90/10 to 40/60. The cycloolefin random copolymers thus obtained have a glass transition temperature (Tg) of usually 10°~240° C., preferably 20°~200° C.

Because the cycloolefin random copolymers of the present invention contain substantially no polyethylene, a substrate for an optical disc composed of said copolymer is capable of minimizing the occurrence of errors in reading due to quality of the substrate.

Particularly preferred copolymerization conditions under which ethylene and cycloolefins represented by the aforementioned general formula [I] or [II] are copolymerized are illustrated hereinafter.

In the present invention, it is preferable to use as a catalyst an organoaluminum compound represented by the formula $R_nAlCl_{3-n}$ wherein n is 1.35~1.65, and R is a straight chain or branched alkyl group of more than 4 carbon atoms.

In the above formula, n is 1.35~1.65 as mentioned above, but n is preferably 1.40~1.60.

The straight chain or branched alkyl group defined as R in the above formula includes concretely butyl, isobutyl, sec-butyl, tert-butyl, n-pentyl, n-hexyl, n-heptyl and n-octyl.

When ethylene and cycloolefin of the aforemention formula [I] or [II] are copolymerized using the organoaluminum compound as mentioned above, for example, isobutylaluminum sesquichloride ($iBu_{1.5}AlCl_{1.5}$), the content of polyethylene in the resulting cycloolefin random copolymer is decreased, and a molded product obtained from said copolymer is improved in transparency, in comparison with the case where ethylaluminum sesquichloride ($Et_{1.5}AlCl_{1.5}$) is used as a catalyst.

When ethylene and the above-mention cycloolefin are copolymerized, for example, using as a catalyst $iBu_{1.5}AlCl_{1.5}$, the content of polyethylene contained in the resulting cycloolefin random copolymer is decreased, and a molded product obtained from said copolymer improves in transparency, in comparison with the case where ethylaluminum sesquichloride is used as a catalyst. Moreover, the amount of polyethylene attaching to the inner wall of the reactor or a portion in the vicinity of a polymer solution withdrawing outlet can be markedly decreased.

In the present invention, it is particularly desirable that the ratio ($C_{OAl}/C_{1Al}$) of a concentration ($C_{OAl}$) of the organoaluminum compound to be fed to a reactor to a concentration ($C_{1Al}$) of said organoaluminum compound present in said reactor is not more than 11, preferably 9~1 and especially 7~1, and the ratio($C_{0V}/C_{1V}$) of a concentration ($C_{0V}$) of the vanadium compound to be fed to a reactor to a concentration ($C_{1V}$) of said vanadium compound present in said reactor is not more than 3, preferably 2.5~1 and especially 2~1.

In carrying out the copolymerization of ethylene and the above-mentioned cycloolefin, when the above-mentioned ratio ($C_{OAl}/C_{1Al}$) is not more than 11, and the above-mentioned ratio ($C_{0V}/C_{1V}$) is not more than 3, the content of polyethylene contained in the resulting cycloolefin random copolymer is decreased, and a molded product obtained from said copolymer is improved in transparency. Moreover, the amount of polyethylene attaching to the inner wall of the reactor and a portion in the vicinity of a polymer solution withdrawing outlet can be markedly decreased.

Furthermore, in the present invention it is particularly desirable that ethylene and the above-mentioned cycloolefin are copolymerized while stirring the polymer solution comprising said ethylene and said cycloolefin by application of a stirring power of more than 2.7 KW/KL, preferably more than 3.5 KW/KL and especially 4.5~10 KW/KL.

In that case it is preferable to feed the vanadium compound and organoaluminum compound, respectively, to the tip portion of a stirring blade.

The stirring power as referred to above includes, for example, a circulating power for the polymer solution necessary for carrying out an external circulation cooling in order to remove a reaction heat.

In carrying out the copolymerization of ethylene and the above-mentioned cycloolefin in the manner as illustrated above, the stirring equipment used therefor may be any of stirring equipments known, per se, for example, those equipped with blades used as stirrers, for example, an anchor type blade, flat plate puddle, slant blade puddle, propeller blade, blue margin blade and Faudler blade. These equipments are preferably equipped with a baffle plate in the inside thereof, though the use of this baffle plate is not critical.

Furthermore, a spiral agitator and a spiral axis agitator equipped with a guiding cylinder may also be used.

In addition to those mentioned above, there may also be used a tubular loop type stirring equipment having its function in stirring and mixing the polymer solution by forcibly circulating said polymer solution by means of a pump, a stirring equipment in which the reaction liquid is stirred by means of a jet caused by blowing a gas thereinto, and a stirring equipment in which the polymer solution is stirred while the equipment rotates by itself.

EFFECT OF THE INVENTION

In accordance with the present invention, there are provided cycloolefin random copolymers containing substantially no polyethylene, and in the substrate for an optical disc prepared from said cycloolefin random copolymer, the occurrence of an error in reading of the disc due to quality of the substrate can be minimized.

The present invention is illustrated below with reference to examples, but it should be construed that the invention is in no way limited to those examples.

Testing Methods

Spirally grooved disk substrates having a diameter of 130 mm are prepared from cycloolefin random copolymers obtained in Examples and Comparative Examples. The substrates are coated by a sputtering apparatus with a 4-layered $SiN_x/TbFeCo/SiN_x/Al$ film (thickness (Å) of each layer: 1100/250/300/400, composition of Tb/Fe/Co: 23/71/6 atomic percent). The bit error rate (BER) of the disks is measured under the conditions described below.

| Evaluation conditions | |
| --- | --- |
| write frequency | 1 MHz |
| write pulse width | 500 ns |
| erase power | 10 mW |
| write power | 8 mW |
| read power | 1.5 mW |
| bias magnetic field | 300 Oe |
| BER measuring area | radius of 40–45 mm |

EXAMPLE 1

Preparation of Catalysts $VO(OC_2H_5)Cl_2$ was diluted with cyclohexane to obtain a vanadium catalyst having a vanadium concentration of 18.6 mmole/liter-cyclohexane. On the other hand, ethylaluminum sesquichloride [$Al(C_2H_5)_{1.5}Cl_{1.5}$] was diluted with cyclohexane to obtain an organoaluminum catalyst having an aluminum concentration of 164 mmole/liter-cyclohexane.

Polymerization

Copolymerization reaction of ethylene, a cycloolefin having the formula

{tetracyclo[4,4,0,1$^{2.5}$,1$^{7.10}$]-3-dodecene} (sometimes merely designated as tetracyclododecene hereinafter) and butene-1 was continuously conducted so that the resultant copolymer contained about 1.2 mol % of butene-1 by using a polymerization equipment system equipped with a polymerization reactor having an inside diameter of 700 mm, a total volume of 570 liter and a reaction volume of 300 liter and provided with baffles and an agitator, a vertical shell and tube heat exchanger having a heat transfer area of 19.4 m$^2$, a circulating line withdrawing a polymerization solution from the bottom of the polymerization reactor having an agitator, circulating the withdrawn polymerization solution within the shell and tube heat exchanger and returning the solution to the polymerization reactor, and a circulating pump installed in the circulating line. During the reaction, the vanadium catalyst (V catalyst) was fed to the polymerization reactor in such a manner that the V catalyst concentration became 0.35 mmole/liter in terms of V in the polymerization reactor. In addition, the V catalyst was diluted beforehand with cyclohexane, a polymerization solvent, so that the V catalyst concentration just before feeding to the polymerization reactor was 1.8 times (dilution ratio) as much as that in the polymerization reactor.

On the other hand, the organoaluminum catalyst containing ethylaluminum sesquichloride was fed to the polymerization reactor so that a feeding ratio Al/V became 8.0. In addition, the organoaluminum catalyst was diluted with cyclohexane, a polymerization solvent, so that the dilution ratio (concentration of Al in the feed/concentration of Al in the reactor) became 11 before feeding. The V catalyst and organo-aluminum catalyst were fed in the vicinity of the upper stage blade tips of the agitator provided with two stage flat-blade turbines, each stage having 6 blades each having a diameter of 0.25 m, and agitating was strongest at the feeding place. As a result, dispersion and mixing of the catalysts were immediately performed.

Cyclohexane was fed to the polymerization reactor as a polymerization solvent at a rate of 233 kg/hr. Ethylene and hydrogen, a chain transfer agent, were fed to the gas phase portion within the polymerization reactor at a rate of 2.69 kg/hr and 2.2 Nl/hr, respectively. The polymerization solution was vigorously stirred by a stirrer with power of 4.3 kW/kl.

An aqueous methanol solution containing 25% by weight of methanol was circulated within the jacket attached to the outer surface of the polymerization reactor and the shell side of shell and tube heat exchanger so that the polymerization temperature was controlled to become 10° C. Nitrogen was introduced into the polymerization reactor so that the polymerization pressure was controlled to become 1.0 Kg/cm$^2$-G.

The inner wall of the polymerization reactor was washed by the following procedure. Namely, a partially bored pan (spray disk) was attached to the agitator shaft portion exposed to the gas phase within the polymerization reactor. Cyclohexane, tetracyclododecene and butene-1 were fed to the spray disk at a rate of 30 kg/hr, 14.2 kg/hr and 0.41 kg/hr, respectively, while the shaft was being rotated, and these substances were splashed from the hole of the spray disk by the centrifugal force produced by the shaft rotation and scattered on the inner wall of the polymerization reactor. These scattered substances flowed down along the inner wall to be mixed with the liquid phase.

As the result of continuously carrying out copolymerization of ethylene, tetracyclododecene and butene-1 under the conditions as described above, a cyclohexane solution containing 34 g/liter of an ethylene/tetracylododecene/butene-1 copolymer was obtained.

Deashing

Distilled water at 80° C. and a solution containing 4% by weight of NaOH were added to the ethylene/tetracyclododecene copolymer-containing solution withdrawn from the polymerizer to terminate the copolymerization reaction, and the catalyst residue remaining in the copolymerization solution was removed (deashing). The resulting copolymerization solution was stored in a vessel equipped with an agitator and having an effective volume of 1.0 m$^3$, cooled at about 30° to 40° C. by passing water at room temperature into a jacket attached to the outside of the vessel.

Filtration

The thus obtained copolymer-containing solution was continuously filtered at a rate of 261 kg/hr by feeding the solution to a filter equipment having 34 cotton fiber wound filters (vertical wound filter, manufactured by Nippon Roki Co., Ltd.) each having an outside diameter of 63.5 mm, an inside diameter of 28 mm, a length of 1 m and a nominal rating of 1 μm.

The resulting solution was further filtered continuously at a rate of 261 kg/hr by feeding the solution to a filter equipment having 3 depth type filters (BX filter, manufactured by Balston Co., Ltd.) each having an outside diameter of 64 mm, an inside diameter of 51 mm and a length of 476 mm and prepared with unwoven cloth (nominal rating of 2 μm) made of borosilicate glass microfibers. During the filtration, the pressure difference was not greater than 1.5 Kg/cm$^2$.

The resulting solution was further filtered continuously at a rate of 261 kg/hr by feeding the solution to a filter equipment having 3 depth type filters (AQ filter, manufactured by Balston Co., Ltd.) each having an outside diameter of 59 mm, an inside diameter of 51 mm and a length of 476 mm and prepared with unwoven cloth (nominal rating of 0.9 μm) made of borosilicate glass microfibers. During the filtration, the pressure difference was not greater than 1.5 Kg/cm$^2$.

The resulting solution was further filtered continuously at a rate of 261 kg/hr by feeding the solution to a filter equipment having 3 depth type filters (AAQ filter, manufactured by Balston Co., Ltd.) each having an outside diameter of 59 mm, an inside diameter of 51 mm and a length of 476 mm and prepared with unwoven cloth (nominal rating of 0.3 μm) made of borosilicate glass microfibers. During the filtration, the pressure difference was not greater than 1.5 Kg/cm$^2$.

Finally, the resulting solution was continuously filtered at a rate of 261 kg/hr by feeding the solution to a filter equipment having 1 pleated type filter (PSP 03 filter, manufactured by Memtec Co., Ltd.) having an outside diameter of 61 mm and a length of 510 mm and prepared with SUS 304 unwoven cloth having a nominal rating of 0.3 μm.

Precipitation

Acetone was added to the copolymer-containing solution to precipitate the copolymer, and the precipitated copolymer was separated.

Unreacted monomers were extracted from the resulting cycloolefin random copolymer, and the copolymer was separated, dried, pelletized, and dried.

Classification

Before filling the pellets dried as described above in product containers, the pellets were freed from fine particles having not greater than 1/10 of the weight of the pellet by using an air classifier. Concretely, they were freed from wear powder of the pellets produced during drying, those pellets having small diameters, crushed pellets, fine foreign materials adhering to the pellets, and the like.

The fine materials were removed by using a zigzag type air classifier having a length of 370 mm, introducing nitrogen at a rate of 30 to 40 $Nm^3$/hr from the bottom, and dropping pellets at a rate of 300 kg/hr from the top.

A substrate was prepared from the thus obtained cycloolefin random copolymer, and an optical disk was prepared from the substrate. The disk showed a bit error rate (BER) of $2.3 \times 10^{-6}$ when tested by the method as described above.

The cycloolefin random copolymer obtained in Example 1 was dissolved in cyclohexane to form a solution containing 34 g/liter of the copolymer. The resulting polymer-containing solution was passed through a fluororesin filter (trade name of Kranfil II, manufactured by Kurashiki Boseki K.K.), and solid polyethylene was retained on the filter in an amount in 2.0 ppm of the copolymer.

During passing the polymer-containing solution mentioned above through the filter, the solution had a temperature of about 35° C. The pressure difference was not greater than 1.6 Kg/$cm^2$, and the flow rate of the solution was 300 kg/hr·$m^2$.

Furthermore, the above-mentioned fluororesin filter had a filtration area of 0.87 $m^2$, and the following flow characteristics were obtained when ethyl alcohol at 25° C. having a viscosity of 1.09 cp was passed.

| Pressure difference (Kg/cm2) | Flow rate (l/min.) |
| --- | --- |
| 0.05 | 16 |
| 0.1 | 30 |
| 0.2 | 50 |

EXAMPLE 2

Example 1 was repeated except that the filtration step was carried out as described below.

Filtration

The copolymer-containing solution was continuously filtered at a rate of 261 kg/hr by feeding the solution to a filter equipment having 34 cotton fiber wound filters (vertical wound filter, manufactured by Nippon Roki Co. Ltd.) each having an outside diameter of 63.5 mm, an inside diameter of 28 mm, a length of 1 m and a nominal rating of 5 μm.

The resulting solution was further filtered continuously by feeding the solution at a rate of 261 kg/hr to a filter equipment having 15 candle filters (trade name of vertical type Fuji Plate Filter, manufactured by Fuji Filter K.K.) each having an outside diameter of 25 mm and a length of 750 mm and prepared with SUS 304-layer sintered wire meshes having a nominal rating of 2 μm.

The resulting solution was further filtered continuously by feeding the solution at a rate of 261 kg/hr to a filter equipment having 3 depth type filters (AQ filter, manufactured by Balston Co., Ltd.) each having an outside diameter of 59 mm, an inside diameter of 51 mm and a length of 476 mm and prepared with unwoven cloth (nominal rating of 0.9 μm) made of borosilicate glass microfibers. During the filtration, the acceptable pressure difference was controlled to be not greater than 1.5 Kg/$cm^2$.

Finally, the resulting solution was continuously filtered by feeding the solution at a rate of 261 kg/hr to a filter equipment having 3 pleated type filters (PSP 03 filter, manufactured by Memtec Co., Ltd.) each having an outside diameter of 61 mm and a length of 510 mm and prepared with SUS 304 unwoven cloth having a nominal rating of 0.3 μm.

A substrate was prepared from the cycloolefin random copolymer thus obtained, and an optical disk was prepared from the substrate. The disk showed a bit error rate (BER) of $4.7 \times 10^{-6}$ when tested by a procedure similar to that in Example 1.

The cycloolefin random copolymer obtained in Example 2 contained solid polyethylene in an amount in 5.8 ppm of the copolymer.

COMPARATIVE EXAMPLE 1

Example 1 was repeated except that the filtration step was carried out as described below.

Filtration

The copolymer-containing solution was continuously filtered by feeding the solution at a rate of 261 kg/hr to a filtering equipment having 34 cotton fiber wound filters (vertical wound filter, manufactured by Nippon Roki Co., Ltd.) having an outside diameter of 63.5 mm, an inside diameter of 28 mm, a length of 1 m and a nominal rating of 5 μm.

The resulting solution was further continuously filtered by feeding the solution at a rate of 261 kg/hr to a filtering equipment having 15 candle filters (trade name of vertical type Fuji Plate Filter, from Fuji Filter Co., Ltd.) having an outside diameter of 25 mm and a length of 750 mm and prepared with SUS 304-layer sintered wire meshes having a nominal rating of 2 μm.

The resulting solution was further continuously filtered by feeding the solution at a rate of 261 kg/hr to 2 filter equipments connected in series each having 3 pleated type filters (PSP 03 filter, manufactured by Memtec Co., Ltd.) each having an outside diameter of 61 mm and a length of 510 mm and prepared with SUS 304 unwoven cloth having a nominal rating of 0.3 μm.

Solid polyethylene could not substantially be separated from the copolymer by these filtration operations.

A substrate was prepared from the thus obtained cycloolefin random copolymer, and an optical disk was prepared from the substrate. The disk showed a bit error rate (BER) of $1.1 \times 10^{-5}$ when tested by a procedure similar to that in Example 1.

The cycloolefin random copolymer obtained in Comparative Example 1 contained solid polyethylene in an amount in 10.8 ppm of the copolymer.

EXAMPLE 3

Copolymerization of ethylene and tetracyclo[4,4,0,1$^{2.5}$,1$^{7.10}$]-3-dodecene (abbreviated to TCD-3 hereinafter) was continuously carried out by using a reactor equipped with a stirring blade and having a capacity of 1 liter. That is, there were continuously fed to the reactor from its upper part, a cyclohexane solution of TCD-3 at a rate of 0.4 liter/hr (TCD-3 concentration of 60 g/liter in the reactor), a cyclohexane solution of VO(OC$_2$H$_5$)Cl$_2$ as a catalyst at a rate of 0.5 liter/hr (vanadium concentration of 0.5 mmole/liter in the reactor, the solution to be fed having a V concentration 2.86 times as much as that in the reactor), a cyclohexane solution of isobutylaluminum sesquichloride [Al(iso-C$_4$H$_9$)$_{1.5}$Cl$_{1.5}$] at a rate of 0.4 liter/hr (Al concentration of 4.0 mmoles/liter in the reactor) and cyclohexane at a rate of 0.7 liter/hr while the polymerization solution was continuously withdrawn from the upper part of the reactor so that the volume of the polymerization solution was always kept at 1 liter in the reactor (namely, average residence time of 0.5 hr). Ethylene, nitrogen and hydrogen were fed to the polymerization system through a bubbling tube at a rate of 20 liter/hr, 10 liter/hr and 0.5 liter/hr, respectively. The copolymerization reaction was carried out at 10° C. by cooling the solution with a coolant circulating within a jacket attached to the outer surface of the reactor. A polymerization reaction mixture containing an ethylene/TCD-3 random copolymer was obtained after performing copolymerization reaction under the above-mentioned conditions. The polymerization reaction of the polymerization solution withdrawn from the upper part of the reactor was terminated by adding a cyclohexane/isopropyl aclcohol mixture solution (1/1 by volume). The polymerization solution was then contacted under strong stirring by a homomixer with an aqueous solution which was prepared by adding 5 ml of concentrated hydrochloric acid to 1 liter of water, in a volume ratio of 1/1 to transfer the catalyst residue to the aqueous layer. The mixture was allowed to stand still, and the aqueous layer was separated. The polymerization solution was washed with distilled water twice to be purified and separated.

Furthermore, as the result of observing the turbidity of the polymerization solution in the reactor during polymerization, the polymerization solution was found to be a brown transparent solution, and judged to have no turbidity. No adhesion of polymer (polyethylene) was observed in the vicinity of the withdrawing outlet for the polymerization solution disposed at the upper part of the polymerizer when the above-described polymerization reaction was carried out for 3 hours.

The polymerization solution thus obtained was contacted with acetone in an amount 3 times as much as that of the solution with strong stirring, and filtered to obtain a solid portion. The solid portion was sufficiently washed with acetone. The solid portion thus obtained was placed in acetone with a solid to acetone ratio (weight/volume) of 40 g/liter, and allowed to stand at 60° C. for 2 hours. A solid portion was then obtained by filtering, and dried under a nitrogen flow at 130° C. and 350 mmHg for 24 hours.

An ethylene/TCD-3 copolymer was obtained at a rate of 70 g/hr (namely, 35 g/liter/hr) by the procedure described above.

The copolymer had an ethylene unit content of 59.0 mol % measured by $^{13}$C-NMR analysis, an intrinsic viscosity [$\eta$] of 0.57 dl/g measured in decalin at 135° C., an iodine value of 1.0 and a crystallinity of 0% obtained by X-ray diffraction.

The loss elastic modulus E" of the copolymer was measured by heating at a rate of 5° C./min using Dynamic Mechanical Analyzer (DMA, trade name, manufactured by Dupont), and a glass transition temperature of 151° C. was obtained from the peak temperature of E". Furthermore, the copolymer was heated at a rate of 10° C./min by DSC (990 type, manufactured by Dupont) in the temperature range of −120° to 400° C. to try to obtain the melting point Tm, but a melting curve (having a peak) was not observed.

Polyethylene contained in a trace amount in the copolymer was evaluated by the following procedure: the copolymer thus obtained was dissolved in cyclohexane, and light transmittance of the polymer solution was measured by a haze meter in accordance with ASTM D 1003-52. That is, 1.0 g of the copolymer was dissolved in 10 ml of cyclohexane, and the light transmittance of the resulting solution placed in a quartz cell having an optical path length of 20 mm was measured to be 94% (light transmittance of cyclohexane alone being defined as 100%).

These evaluation results are shown in Table 1.

EXAMPLES 4 TO 7

Example 3 was repeated except that some conditions were altered as listed in Table 1 to perform copolymerization of ethylene and TCD-3.

The polymerization results are shown in Table 1.

In addition, a mixture of isobutylaluminum dichloride (isobutyl)AlCl$_2$ and isobutylaluminum sesquichloride (isobutyl)$_{1.5}$AlCl$_{1.5}$ in a molar ratio of 2/8 was prepared beforehand, and used in the polymerization reaction in Example 6 as the organoaluminum compound (isobutyl)$_{1.4}$AlCl$_{1.6}$. Similarly, a mixture of (isobutyl)$_{1.5}$AlCl$_{1.5}$ and (isobutyl)$_2$AlCl in a molar ratio of 8/2 was prepared beforehand, and used in Example 5 as (isobutyl)$_{1.6}$AlCl$_{1.4}$ in Example 5.

EXAMPLE 8

The procedure of Example 3 was repeated except that there was employed 1,4-methano-1,4,4a,9a-tetrahydrofluorene (abbreviated to MTHF), which is a Diels-Alder adduct of cyclopentadiene and indene, as a cycloolefin in the copolymerization reaction in place of TCD-3.

The polymerization results are shown in Table 1.

REFERENCE EXAMPLES 1 TO 3

Example 3 was repeated except that some conditions were altered as listed in Table 1 to carry out copolymerization reaction of ethylene and TCD-3.

The polymerization results are shown in Table 1.

In addition, a mixture of (isobutyl)AlCl$_{2.0}$ and (isobutyl)$_{1.5}$AlCl$_{1.5}$ in a molar ratio of 5/5 and a mixture of (isobutyl)$_{1.5}$AlCl$_{1.5}$ and (isobutyl)$_2$AlCl in a molar ratio of 5/5 were prepared beforehand and used as an organoaluminum compound (isobutyl)$_{1.25}$AlCl$_{1.75}$ in Reference Example 2 and as an organoaluminum compound (isobutyl)$_{1.75}$AlCl$_{1.25}$ in Reference Example 3, respectively.

TABLE 1

| | Polymerization condition (those altered alone) | | | | | Basic physical properties of copolymer | | | |
|---|---|---|---|---|---|---|---|---|---|
| | Types of cyclo-olefin | Types of RnAlCl$_{3-n}$ | | Al concn. in system (mmol/l) | Al/V molar ratio in system | Yield of co-polymer (g/l) | Composition | | Intrinsic viscosity [$\eta$] (dl/g) |
| | | R | n | | | | Ethylene (mol %) | Cycloolefin (mol %) | |
| Ex. 3 | TCD-3 | Isobutyl | 1.50 | 4.0 | 8 | 35 | 69.0 | 41.0 | 0.57 |
| Ex. 4 | TCD-3 | n-Hexyl | 1.50 | 4.0 | 8 | 33 | 60.4 | 39.6 | 0.49 |
| Ex. 5 | TCD-3 | Isobutyl | 1.40 | 4.0 | 8 | 30 | 59.6 | 40.4 | 0.61 |
| Ex. 6 | TCD-3 | Isobutyl | 1.60 | 4.0 | 8 | 32 | 58.3 | 41.7 | 0.56 |
| Ex. 7 | TCD-3 | Isobutyl | 1.50 | 6.0 | 12 | 29 | 59.1 | 40.9 | 0.54 |
| Ex. 8 | MTHF | Isobutyl | 1.50 | 4.0 | 8 | 34 | 62.5 | 37.5 | 0.58 |
| Ref. Ex. 1 | TCD-3 | Ethyl | 1.50 | 4.0 | 8 | 40 | 60.8 | 39.2 | 0.56 |
| Ref. Ex. 2 | TCD-3 | Isobutyl | 1.25 | 4.0 | 8 | 21 | 60.7 | 39.3 | 0.66 |
| Ref. Ex. 3 | TCD-3 | Isobutyl | 1.75 | 4.0 | 8 | 23 | 65.9 | 34.1 | 0.71 |

| | Basic physicl properties of copolymer | | | Evaluation of trace amt. of polyethylene present in copolymer | | |
|---|---|---|---|---|---|---|
| | Crystal-linity by X-ray diffraction (%) | DMA method Tg (°C.) | DSC method Tm (°C.) | Turbidity of polymn. soln. (visual) | Polymer adhering to polymn. soln. withdrawal outlet (visual) | Transparency of polymer soln. (light transmittance %) |
| Ex. 3 | 0 | 151 | Not observed | Transparent | none | 94 |
| Ex. 4 | 0 | 149 | Not observed | Transparent | none | 94 |
| Ex. 5 | 0 | 150 | Not observed | Transparent | none | 90 |
| Ex. 6 | 0 | 153 | Not observed | Transparent | none | 91 |
| Ex. 7 | 0 | 150 | Not observed | Transparent | none | 96 |
| Ex. 8 | 0 | 145 | Not observed | Transparent | none | 91 |
| Ref. Ex. 1 | 0 | 150 | Not observed | Slightly turbid | a little | 73 |
| Ref. Ex. 2 | 0 | 150 | Not observed | Turbid | none | 62 |
| Ref. Ex. 3 | 0 | 139 | Not observed | Turbid | none | 59 |

EXAMPLE 9

The step for the preparation of a catalyst in Example 1 was repeated, and the step for polymerization in Example 1 was repeated except that the polymerization solution was stirred with the stirrer at power of 4.4 kW/kl to obtain a cyclohexane solution containing 4.0 to 4.3% by weight of an ethylene/tetracyclododecene/-butene-1 copolymer.

The step for deashing in Example 1 was repeated.

Subsequently, the steps for filtration and precipitation were conducted as described below.

Filtration

The thus obtained copolymer-containing solution was continuously filtered by feeding the solution at a rate of 261 kg/hr to a filtering equipment having 34 cotton bobbin winder filters (vertical wind filter, manufactured by Nippon Roki K.K.) each having an outside diameter of 63.5 mm, an inside diameter of 28 mm, a length of 1 m and a nominal size of 1 μm.

The filtered solution was further continuously filtered by feeding the solution at a rate of 261 kg/hr to a filter having 15 tubular filters (trade name of Vertical Type Fuji Plate Filter, manufactured by Fuji Filter K.K.) each having an outside diameter of 25 mm and a length of 750 mm and prepared with laminated SUS 304 meshes having a nominal size of 2 μm.

Furthermore, the resulting solution was continuously filtered at a rate of 261 kg/hr by feeding the solution to 2 filtering equipments (connected in series) each having 3 pleat type filters (PSP 03 filter, manufactured by Memtec Co., Ltd.) each having an outside diameter of 61 mm and a length of 510 mm and prepared with SUS 304 unwoven cloth having a nominal size of 0.3 μm.

Precipitation

Acetone was added to the copolymerization solution thus filtered to precipitate the copolymer, and the copolymer thus obtained was separated. Unreacted monomers were extracted from the thus obtained cycloolefin random copolymer. The random copolymer was separated, dried, pelletized and dried.

A cycloolefin random copolymer was prepared as described above, and the filter medium was clogged after operating the filtration for 9 days.

An optical disk was prepared from the thus obtained cycloolefin random copolymer. The disk showed significantly decreased read error considered to be caused by polyethylene contained in the substrate compared with the optical disk prepared from the copolymer obtained in Comparative Example 2 described below.

COMPARATIVE EXAMPLE 2

Example 9 was repeated except that the organoaluminum catalyst had, just before feeding to the polymerizer, an Al concentration 60 times as much as that in the polymerizer, and that the stirring power was slightly lowered.

A cycloolefin random copolymer was prepared as described above, and the filter medium was clogged after operating the filtration for 5 days.

COMPARATIVE EXAMPLE 3

Example 9 was repeated except that the polymerization solution was stirred with a stirrer at stirring power of 1.6 kW/kl (total stirring power of 2.6 kW/kl), and that the organoaluminum catalyst had, just before feeding to the polymerizer had an Al concentration 80 times as much as that in the polymerizer.

A cycloolefin random copolymer was prepared as described above, and the filter medium was clogged during the filtration operation probably due to the formation of polyethylene in the polymerization reaction after operating the filtration for 2 days.

What is claimed is:

1. A cycloolefin random copolymer of (a) ethylene and (b) at least one cycloolefin selected from the group consisting of unsaturated monomers represented by the following formulae (I) and (II):

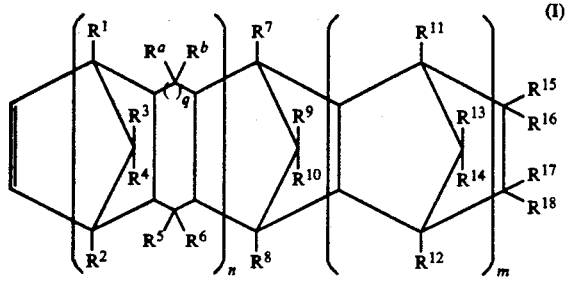

wherein n is 0 or 1, m is 0 or an integer of a positive number, q is 0 or 1, $R^1$-$R^{18}$ and $R^a$ and $R^b$ are each hydrogen atom, halogen atom or a hydrocarbon residue $R^{15}$-$R^{18}$, linked with one another, may form a monocyclic ring or polycyclic ring which may have a double bond, $R^{15}$ and $R^{16}$ or $R^{17}$ and $R^{18}$ may together form an alkylidene group, and

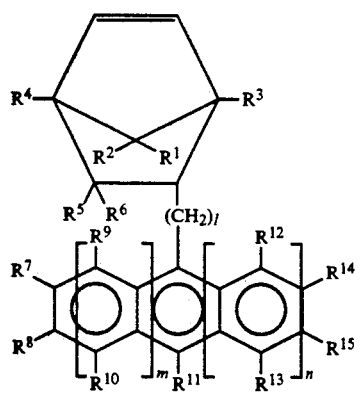

wherein l is 0 or an integer of more than 1, m and n are each 0, 1 or 2, $R^1$-$R^{15}$ are each hydrogen atom, halogen atom, an aliphatic hydrocarbon residue, an aromatic hydrocarbon residue or an alkoxy group, $R^5$ (or $R^6$) and $R^9$ (or $R^7$) may link together through an alkylene group of 1-3 carbon atoms or may link directly; wherein said cycloolefin random copolymer contains solid polyethylene in an amount of not more than 6 ppm of the weight of the copolymer.

2. The cycloolefin random copolymer of claim 1 wherein the amount of solid polyethylene in the copolymer is measured by passing a solution of said copolymer through a fluororesin filter.

3. A process for preparing a cycloolefin random copolymer by copolymerizing (a) ethylene and (b) at least one cycloolefin selected from the group consisting of unsaturated monomers represented by the formulae (I) and (II),

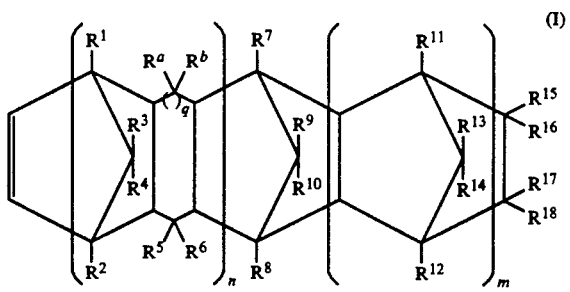

wherein n is 0 or 1, m is 0 or an integer of a positive number, q is 0 or 1, $R^1$-$R^{18}$ and $R^a$ and $R^b$ are each hydrogen atom, halogen atom or a hydrocarbon residue, $R^{15}$-$R^{18}$, linked with one another, may form a monocyclic ring or polycyclic ring which may have a double bond, $R^{15}$ and $R^{16}$ or $R^{17}$ and $R^{18}$ may together form an alkylidene group, and

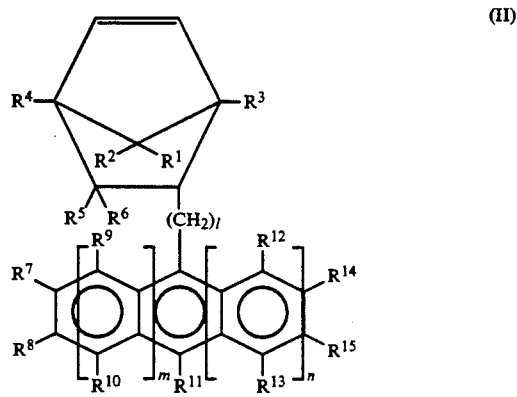

wherein l is 0 or an integer of more than 1, m and n are each 0, 1 or 2, $R^1$-$R^{15}$ are each hydrogen atom, halogen atom, an aliphatic hydrocarbon residue, an aromatic hydrocarbon residue or an alkoxy group, $R^5$ (or $R^6$) and $R^9$ (or $R^7$) may link together through an alkylene group of 1-3 carbon atoms or may link directly; in a hydrocarbon solvent or in a liquid phase consisting of the above-mentioned cycloolefin in the presence of a catalyst formed from a soluble vanadium compound and an organoaluminum compound, said process involving a step of filtration to separate and remove a solid polyethylene as a side reaction product from the resulting cycloolefin random copolymer solution containing the same;

wherein the resulting cycloolefin random copolymer contains solid polyethylene in an amount of not more than 6 ppm of the weight of the copolymer.

4. The process for preparing a cycloolefin random copolymer of claim 3 wherein the amount of solid polyethylene in the copolymer is measured by passing a solution of said copolymer through a fluororesin filter.

5. A process for preparing a cycloolefin random copolymer by copolymerizing (a) ethylene and (b) at least one cycloolefin selected from the group consisting of unsaturated monomers represented by the formulae (I) and (II):

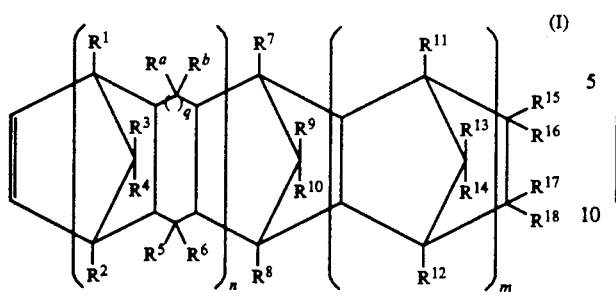

(I)

wherein n is 0 or 1, m is 0 or an integer of a positive number, q is 0 or 1, $R^1$-$R^{18}$ and $R^a$ and $R^b$ are each hydrogen atom, halogen atom or a hydrocarbon residue, $R^{15}$-$R^{18}$, linked with one another, may form a monocyclic ring or polycyclic ring which may have a double bond, $R^{15}$ and $R^{16}$ or $R^{17}$ and $R^{18}$ may together form an alkylidene group, and

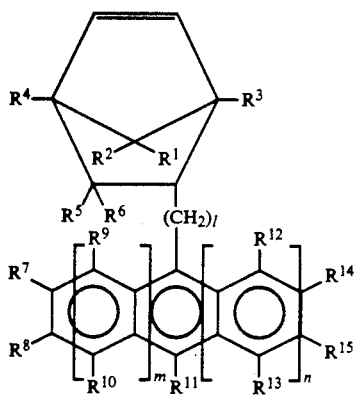

(II)

wherein l is 0 or an integer of more than 1, m and n are each 0, 1 or 2, $R^1$-$R^{15}$ are each hydrogen atom, halogen atom, an aliphatic hydrocarbon residue, an aromatic hydrocarbon residue or an alkoxy group, $R^5$ (or $R^6$) and $R^9$ (or $R^7$) may link together through an alkylene group of 1-3 carbon atoms or may link directly; in a hydrocarbon solvent or in a liquid phase consisting of the above-mentioned cycloolefin in the presence of a catalyst formed from a soluble vanadium compound and an organoaluminum compound, wherein the organoaluminum compound used in forming the catalyst is an organoaluminum compound represented by the formula:

wherein n is 1.35–1.65, and R is an isobutyl or hexyl group.

6. A process for preparing a cycloolefin random copolymer by copolymerizing (a) ethylene and (b) at least one cycloolefin selected from the group consisting of unsaturated monomers represented by the formulae (I) and (II):

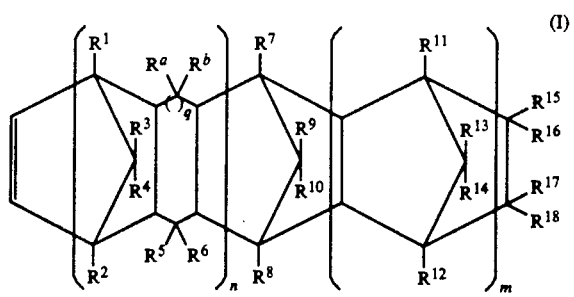

(I)

wherein n is 0 or 1, m is 0 or an integer of a positive number, q is 0 or 1, $R^1$-$R^{18}$ and $R^a$ and $R^b$ are each hydrogen atom, halogen atom or a hydrocarbon residue, $R^{15}$-$R^{18}$, linked with one another, may form a monocyclic ring or polycyclic ring which may have a double bond, $R^{15}$ and $R^{16}$ or $R^{17}$ and $R^{18}$ may together form an alkylidene group, and

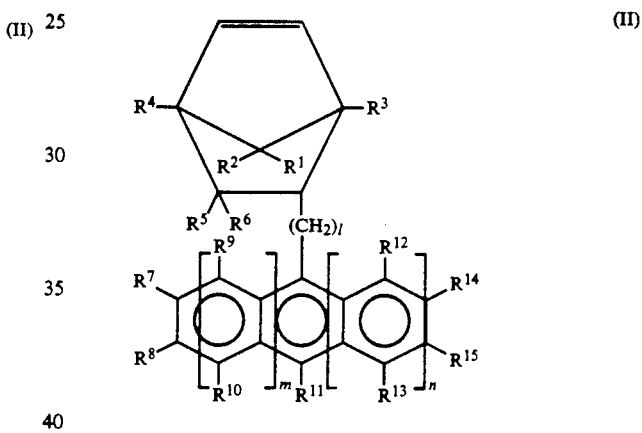

(II)

wherein l is 0 or an integer of more than 1, m and n are each 0, 1 or 2, $R^1$-$R^{15}$ are each hydrogen atom, halogen atom, an aliphatic hydrocarbon residue, an aromatic hydrocarbon residue or an alkoxy group, $R^5$ (or $R^6$) and $R^9$ (or $R^7$) may link together through an alkylene group of 1-3 carbon atoms or may link directly; in a hydrocarbon solvent or in a liquid phase consisting of the above mentioned cycloolefin in the presence of a catalyst formed from a soluble vanadium compound and an organoaluminum compound, wherein the ratio ($C_0$ $_{Al}$/$C_1$ $_{Al}$) of a concentration ($C_0$ $_{Al}$) of the organoaluminum compound to be fed to a reactor to a concentration ($C_0$ $_{Al}$) of said organoaluminum compound present in said reactor is not more than 11, and the ratio ($C_0$ $_V$/$C_1$ $_V$) of a concentration ($C_0$ $_V$) of the vanadium compound to be fed to a reactor to a concentration ($C_1$ $_V$) of said vanadium compound present in said reactor is not more than 3.

7. A process for preparing a cycloolefin random copolymer by copolymerizing (a) ethylene and (b) at least one cycloolefin selected from the group consisting of unsaturated monomers represented by the formulae (I) and (II):

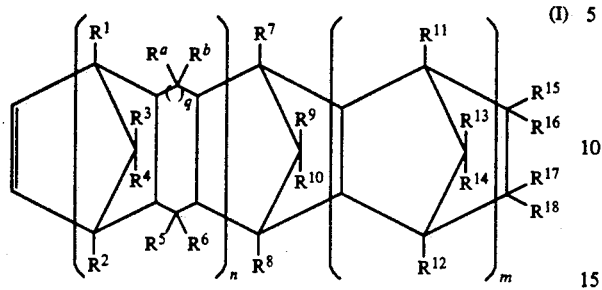 (I)

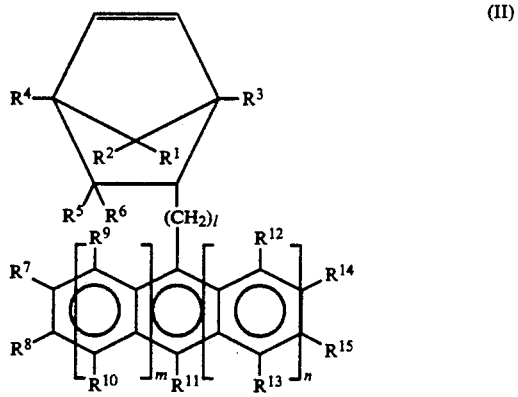 (II)

wherein n is 0 or 1, m is 0 or an integer of a positive number, q is 0 or 1, $R^1$–$R^{18}$ and $R^a$ and $R^b$ are each hydrogen atom, halogen atom or a hydrocarbon residue, $R^{15}$–$R^{18}$, linked with one another, may form a monocyclic ring or polycyclic ring which may have a double bond, $R^{15}$ and $R^{16}$ or $R^{17}$ and $R^{18}$ may together form an alkylidene group, and wherein l is 0 or an integer of more than 1, m and n are each 0, 1 or 2, $R^1$–$R^{15}$ are each hydrogen atom, halogen atom, an aliphatic hydrocarbon residue, an aromatic hydrocarbon residue or an alkoxy group, $R^5$ (or $R^6$) and $R^9$ (or $R^7$) may link together through an alkylene group of 1–3 carbon atoms or may link directly; in a hydrocarbon solvent or in a liquid phase consisting of the above-mentioned cycloolefin in the presence of a catalyst formed from a soluble vanadium compound and an organoaluminum compound, wherein the copolymerization of ethylene and cycloolefin is carried out while stirring and mixing the reaction liquid of said ethylene and said cycloolefin by means of application thereto of a stirring power of more than 2.7 KW/KL.

* * * * *